ELECTRICAL SIGNAL GENERATOR

Filed Oct. 18, 1966 2 Sheets-Sheet 1

INVENTOR.
Nephi Edward Berg
BY
Roberts, Cushman & Grover
ATTORNEYS

INVENTOR.
Nephi Edward Berg
BY
Roberts, Cushman & Grover
ATTORNEYS 3,500,212
Patented Mar. 10, 1970

3,500,212

ELECTRICAL SIGNAL GENERATOR

Nephi Edward Berg, Peabody, Mass., assignor, by mesne assignments, to Hendrix Electronics Inc., Milford, N.H., a corporation of Delaware Filed Oct. 18, 1966, Ser. No. 587,583
Int. Cl. H03b *19/00*
U.S. Cl. 328—14 9 Claims

ABSTRACT OF THE DISCLOSURE

A generator of deflection waveforms for tracing the sloped traverses of alphanumeric characters on a cathode ray tube comprises a ring counter generating a plurality of equal square waveforms successively occurring at constant frequency. In each of a plurality of channels from the generator each square wave is converted by a diode bridge into a triangular pulse overlapping the successive triangular pulse in another channel. All the triangular pulses overlap a preceding or succeeding pulse by an equal interval of time. Further in each channel an attenuator network modifies the amplitude of each triangular pulse. The modified triangular pulses are all combined at a summing junction to form the several traverses of a composite waveform which produces the horizontal or vertical deflection voltage which causes the cathode ray to trace a character on the screen of the tube.

Voltage signals of predetermined form or pattern may, for example, be applied to the X and Y coordinate deflection circuits of a cathode ray tube to cause the tube to trace a desired figure, curve, symbol or alphanumeric unit, all of which are hereinafter referred to as characters. Thus a letter may be formed by a series of strokes or traverses, each stroke being produced by simultaneous linear excursions or increments of the X and Y deflection voltages. For each character to be produced there are two predetermined deflection voltage signals or waveforms whose increments represent the X and Y coordinates of the character traverses.

Objects of the present invention are to provide apparatus for rapid and repeated generation of signals of predetermined waveform of the analog or deflection types, which is greatly simplified, economical, and stable.

For the purposes of illustration a typical embodiment of the invention is shown in the accompanying drawing in which.

Figure 1:
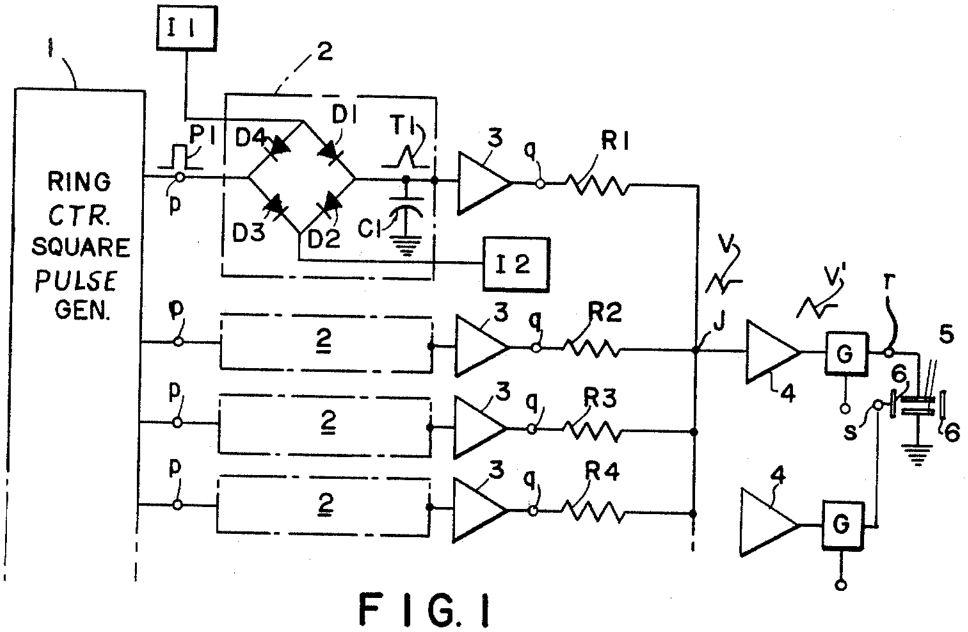
FIG. 1 is a diagram of a character deflection voltage generating circuit.
Figure 2:
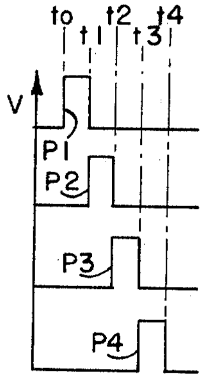
FIGS. 2 to 5 are graphic representations of the steps in electrically generating the character A.
Figure 3:
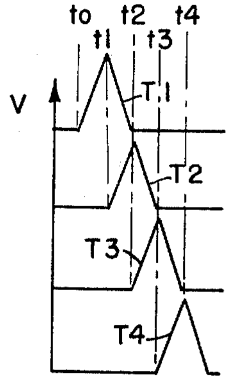

The circuit shown in FIG. 1 comprises a ring counter 1 having a plurality of outputs *p*, at each of which appears a positive square wave pulse P1, P2, etc. typically of +8 volts, and of form shown in FIG. 2. Such an oscillator is known and comprises timing means which forms pulses equal in amplitude and duration and at a constant frequency of, for example, one megacycle per second. Thus the interval from time *t0* to time *t1* of the first pulse P1 is the same as the interval *t1* to *t2* of the second pulse P2, and so on. Connected to each output *p* is a converter 2 comprising a diode bridge 3 having a positive constant current supply I1, e.g. 2 milliamperes at +6 volts, and a negative constant current supply, e.g. 2 milliamperes at —10 volts.

Figures 6, 7:
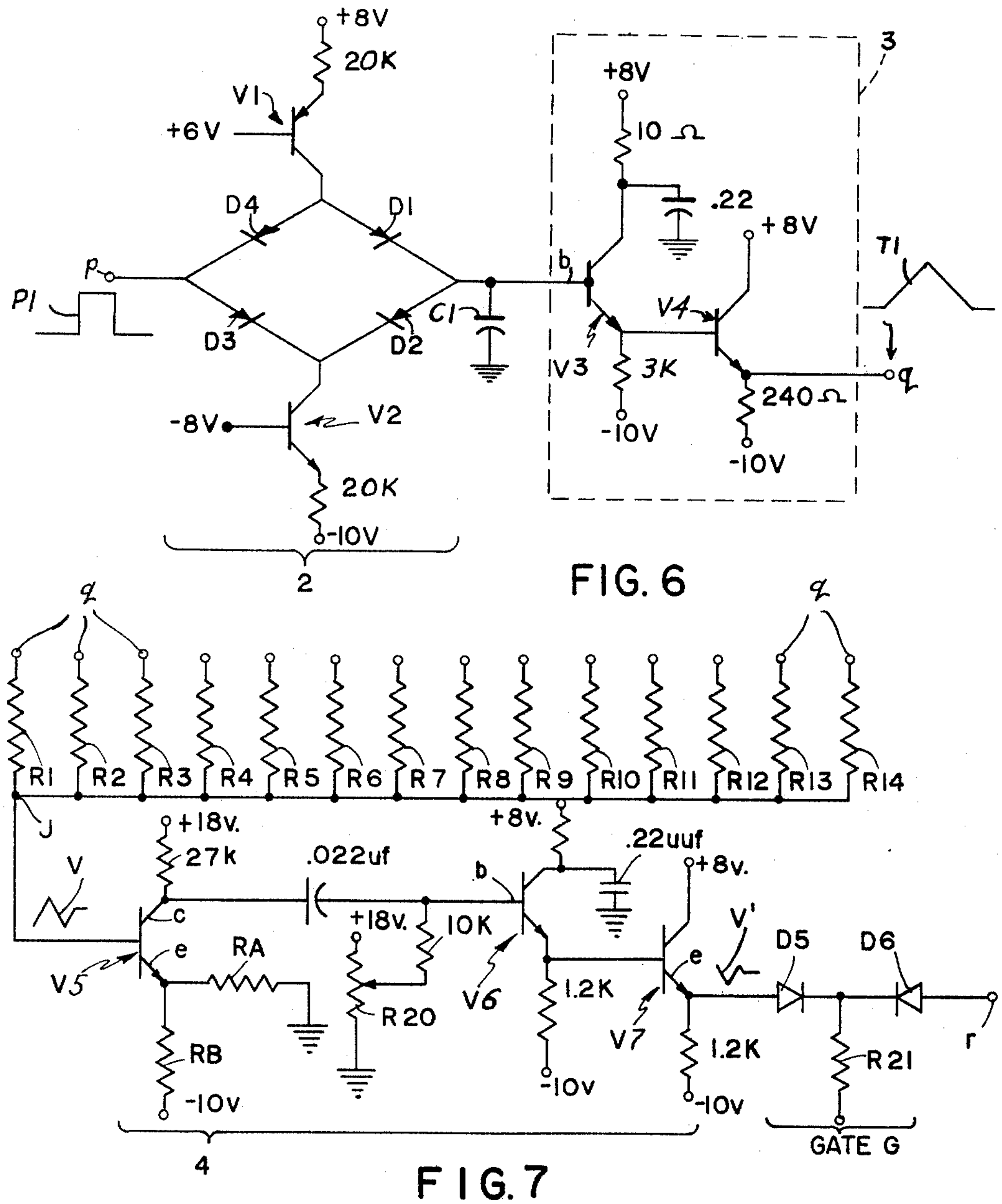
FIGS. 6 and 7 are schematic diagrams of portions of the circuit of FIG. 1.

As shown in more detail in FIG. 6 the diode bridge

D1–D4 is supplied by a positive constant current source comprising a transistor V1 (type 2N706) having a +8 volt emitter supply and held conducting a constant current with a constant base bias of about +6 volts. Similarly a negative 10 volt supply voltage applied to a transistor V2 on the opposite side of the bridge is held conducting constant current by a —8 volt bias, as follows:

Prior to the initial positive rise of a square wave input pulse such as P1, both sides D1, D2 and D3, D4 of the bridge conduct constant current. The potential across the virtually discharged capacitor C1 and at the base *b* of transistor V3 is approximately at ground. When the square wave pulse at terminal P rises at time *t0* to a peak value of about +4 volts, diodes D2 and D4 are back biased and cut off. Current from the positive supply then charges the capacitor to about +2 volts. At the end of the square wave pulse P1 at time *t1*, the positive potential of the capacitor back biases diode D1 and the capacitor discharges through diode D2 to the negative supply.

During charge and discharge the potential at the capacitor C1 and base *b* of transistor V3 has risen to a positive peak during time *t0* to *t1* and fallen to its original level from time *t1* to time *t2*. By virtue of the constant current character of the supplies no resistance enters into the charging and discharging of capacitor C1, and its voltage excursions are linear and equal and opposite in slope.

Figure 4:
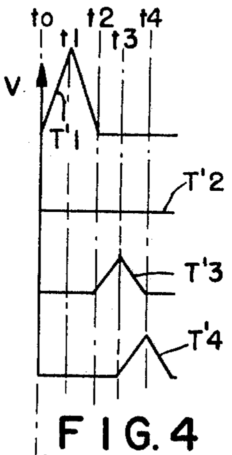

The several output terminals *q* are connected through resistances R1, R2, R3, R4, etc. to a summing junction J. These resistances have ohmic values selected to reduce the amplitude of the triangular voltages T1, etc. by different amounts so as to produce attenuated triangular voltages T'1, etc. as shown in FIG. 4. From FIG. 4 it can be seen that resistor R1 has a very low or nearly zero value and voltage T'1 is not attenuated with respect to voltage T. Resistance R2 has an extremely high or open circuit value so that voltage T'2 is attenuated to zero level. Resistances R3 and R4 have intermediate values and produce voltages T'3 and T'4 attenuated about one-half. The value of the resistance R1, etc., in each channel is thus selected to bear the same proportion to the value of the resistance in each other channel as the amplitude of the corresponding attenuated voltage increment, T'1, etc., bears to the other voltage increments of the composite waveform V*y* of FIG. 5 described below. Typical values for the attenuator resistances are given hereinafter in connection with the description of FIG. 7. The attenuated voltages retain their equal frequency, duration and overlap, but are added together during transmission through the resistors to the summing junction J. This addition is shown graphically by projection of FIG. 4 to FIG. 5.

Figure 5:
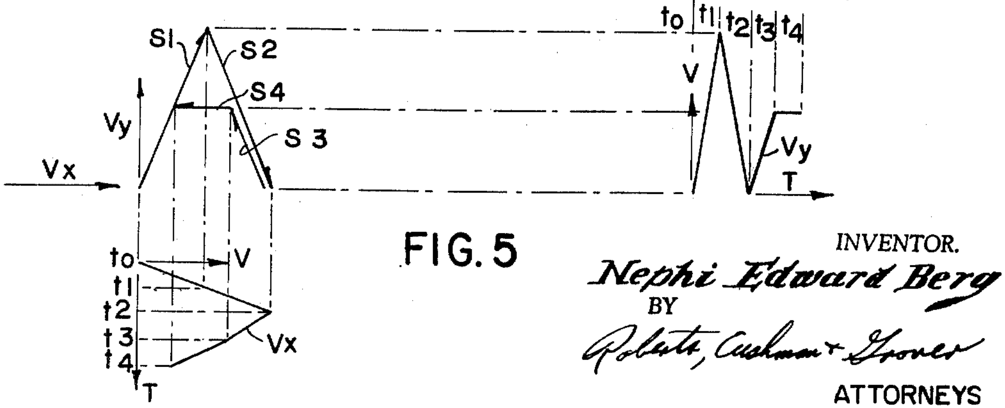

As shown in FIGS. 4 and 5, from time *t0* to time *t1* attenuated triangular pulse T'1 appears as an upward excursion from zero of voltage V*y* appearing at the junction J. From time *t1* to time *t2* the downward excursion of pulse T'1 is added to pulse T'2. Pulse T'2 remaining at zero level, however, the junction voltage V*y* follows pulse T'1 to zero. From time *t2* to time *t3* the junction voltage follows the upward excursion of pulse T'3 to an intermediate amplitude unaffected by the overlap with zero level pulse T'2. From time *t3* to time *t4* the upward excursion of pulse T'4 is compensated by the equal and opposite excursion of pulse T'3 thereby holding voltage V*y* at the intermediate level. By suitable blanking techniques the subsequent excursion of pulse T'4 is blocked from entering into the generation of waveform V*y*.

Waveform V*y* of FIG. 5 represents the time versus vertical amplitude of a cathode ray tube deflection voltage. Waveform V*x* represents the horizontal deflection voltage and is generated by a circuit generally identical with that of FIG. 4, but with attenuator resistors selected to produce suitable excursions of waveform $Vx$ during the same time intervals $t0$ to $t1$, etc. Projected from waveforms $Vx$ and $Vy$ is the character A which the flying spot of a cathode ray tube traces when the signals $Vx$ and $Vy$ are applied respectively to its horizontal and vertical deflection circuits. During time $t0$ to time $t1$ the excursions of voltages $Vx$ and $Vy$ produce a travers or stroke S1 along one leg of the character A. During the subsequent time intervals strokes S2, S3 and S4 complete the tracing of the character.

The vertical deflection signal V at the junction J is amplified in a typical amplifier stage 4 and the amplified signal V' is applied through a gate G to the cathode ray input *r* of deflection circuits indicated as deflection plates 5 for the vertical signal component $Vy$. The gate is opened from time $t0$ to time $t4$ and blanks out excursions of voltages $Vy$ occurring outside this interval. Simultaneously the corresponding horizontal deflection voltage is gated through a terminal *s* to the horizontal deflection system shown as plates 6.

While a four stroke character requiring only four resistors is shown and has been given as an example, other more elaborate characters will require more strokes and resistors.

FIG. 7 shows fourteen attenuator channels connected between the triangular pulse amplifier terminals *q* and the summing junction J, followed by an example of the amplifier 4 and gate G of FIG. 1. Such channels will produce characters with up to fourteen strokes and consequent finer detail. The table below gives values in kilohms of the resistors for eleven stroke X and Y deflection voltages for the character A, and for a twelve stroke character B.

| | Character A | | Character B | |
|---|---|---|---|---|
| | $Vx$ | $Vy$ | $Vx$ | $Vy$ |
| R1 | 10.0 | Open | 4.99 | Open |
| R2 | 3.92 | 2.61 | 4.99 | 2.87 |
| R3 | 2.87 | 1.62 | 4.99 | 1.93 |
| R4 | 2.0 | 1.0 | 4.99 | 1.0 |
| R5 | 1.58 | 1.5 | 1.65 | 1.0 |
| R6 | 1.3 | 3.09 | 1.33 | 1.18 |
| R7 | 1.1 | Open | 1.33 | 1.54 |
| R8 | 1.1 | 3.09 | 1.65 | 2.0 |
| R9 | 1.3 | 3.09 | 4.99 | 2.0 |
| R10 | 2.0 | 3.09 | 1.65 | 2.0 |
| R11 | 4.32 | Open | 1.43 | 3.32 |
| R12 | Open | Open | 1.18 | Open |
| R13 | Open | Open | Open | Open |
| R14 | Open | Open | Open | Open |
| RA | 1.1 | 1.4 | 0.953 | 0.887 |
| RB | 2.61 | 3.3 | 2.21 | 2.05 |

Values of the resistors RA and RB in the amplifier circuit 4 are also given.

The amplifier 4 for each deflection voltage amplifier comprises three transistor stages V5 (2N706), V6 (2N706) and V7 (2N696). The emitter *e* of the first stage V5 is biased by voltage dividing resistors RA and RB between a −10 volt supply and ground so as to establish the gain of stage V5. The maximum range of voltage excursion at the emitter *e* of the third stage V7 and hence the maximum excursion of the deflection voltage is thereby established. The base line voltage from which the deflection voltage rises is determined by a potentiometer R20 between the base *b* of the second stage V6 for the AC coupled amplifier 4 shown. The amplifier may be DC coupled with suitable bias and base line adjustment.

The negative going amplified deflection voltage V' at the output of each amplifier 4 is applied to a gate circuit G comprising two type 1N4009 diodes D5 and D6 connected in opposite polarity to a gating pulse input resistor R21 (180 ohms). In the absence of a gating pulse the deflection waveform V' is blocked from the deflection terminal *r* or *s*. By means of a manual switch or a programmer, not shown, the Y deflection signal $Vy$ is transmitted to the input terminal *r* by application through the resistor R21 of a square wave gating pulse of greater negative voltage than the maximum of the deflection voltage. Similarly the corresponding X deflection voltage $Vx$ is gated simultaneously to the input terminals. The duration of the square wave gating pulse corresponds with the duration of deflection voltage. For example, with the deflection voltages of FIG. 5 the duration is $t0$ to $t4$; for the deflection voltages $Vx$ and $Vy$ for character A of the table the duration is $t0$ to $t11$; and for the character B, $t0$ to $t12$.

Figure 8:
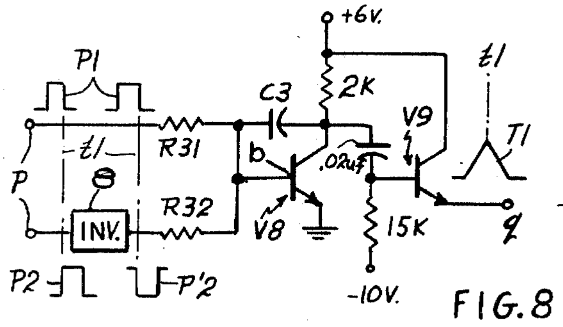
FIG. 8 is a schematic diagram of another form of the circuit of FIG. 6.

The alternative triangular wave generator shown in FIG. 8 comprises two inputs *p* for successive square wave pulses, e.g. P1 and P2 of the generator 1 of FIG. 1. The earlier pulse P1 goes positive from a zero baseline to about 3.5 volts and is applied through a 100 ohm resistor R31 to the base *b* of an integrator stage V8. The succeeding pulse P2 is inverted in polarity in an inverter 8 with unity gain to form a pulse P'2 negative going from 3.5 volts positive to zero base line. The second pulse P'2 is applied through a 100 ohm resistor R32 to the base *b* of the integrator V8, which base *b*, in the absence of a pulse floats at about +1.75 volts. A 300 micromicrofarad capacitor C3 combines with resistors R31 and R32 to form an integrating network for the input pulses P1 and P'2. These pulses are summed at the base *b* and cause the voltage at the base to rise substantially linearly from 1.75 volts to 3.5 volts during the interval of the first pulse P1. Then during the interval of the second pulse P'2 the voltage returns linearly to 1.75 volts. This triangular voltage excursion is amplified in stage V8 and coupled by an 0.02 microfarad capacitor to the base of an emitter follower V9, type 2N706, at whose emitter output *q* triangular waveform T1 appears.

While certain desirable embodiments of the invention have herein been illustrated and described, it is to be understood that these are mainly by way of example, and the invention is broadly inclusive of any and all modifications falling within the scope of the appended claims.

I claim:

1. Apparatus for producing an electrical signal of predetermined waveform during a given time interval comprising:

- means for generating a succession of separate substantially triangular pulses during said interval, each pulse having positive and negative slope portions, the negative slope portion of one being equal in duration to a corresponding positive slope portion of an adjacent wave in said succession;
- means timing said pulses to start each succeeding pulse at the peak point of the preceding pulse throughout said interval for producing time overlap of the corresponding equal duration opposite slope portions of adjacent pulses;
- means for modifying the relative amplitudes of said separate pulses and
- combining the modified amplitude pulses to synthesize said predetermined waveform from increments the magnitude and direction of which are determined by the relative amplitude of the adjacent pulses combined, said time overlap of said opposite slope portions providing for any of positive, zero and negative slope increments.

2. Apparatus according to claim 1 wherein said means for generating comprises means for forming triangular voltage pulses having linear leading and trailing edges.

3. Apparatus according to claim 2 in which said triangular voltage pulses have symmetrical leading and trailing edges.

4. Apparatus according to claim 1 wherein said means for generating and said means timing said pulses comprises a ring counter producing a set of separate successive rectangular pulses contiguous in time during said interval and bipolar means for integrating said separate successive rectangular pulses to produce said triangular pulses each having a slope of one sign for the duration of one of said square pulses and a slope of the opposite sign for the duration of the next following rectangular pulse.

5. Apparatus according to claim 4 wherein said bipolar integrators comprise a rectifier bridge, an integrating capacitor coupled to said bridge, positive and negative constant current supplies coupled to said bridge, and means coupling said rectangular wave to said bridge for controlling charging and discharging of said capacitor through said constant current supplies.

6. Apparatus according to claim 1 in which said means for modifying and combining the relative amplitudes comprises a resistive adding network having a plurality of input resistors of predetermined relative value and means coupling said substantially triangular pulses to respective ones of said input resistors.

7. Apparatus according to claim 6 and including output means coupled to an output of said adding network to be responsive to the sum of said modified amplitude pulses applied to said input resistors.

8. The method for producing an electrical signal of predetermined waveform during a given time interval comprising the steps of:

generating a succession of separate substantially triangular pulses during said interval each pulse having positive and negative slope portions, the negative slope portion of one being equal in duration to a corresponding positive slope portion of an adjacent wave in said succession;

timing said pulses to start each succeeding pulse at the peak point of the preceding pulse throughout said interval for producing time overlap of the corresponding equal duration opposite slope portions of adjacent pulses;

modifying the relative amplitudes of said separate pulses; and combining the modified amplitude pulses to synthesize said predetermined waveform from increments the magnitude and direction of which are determined by the relative amplitude of the adjacent pulses combined, said time overlap of said opposite slope portions providing for any of positive, zero and negative slope increments.

9. Electrical apparatus for producing electrical deflection signals whose respective incremental values are a series of voltage coordinates of a plurality of deflection traverses of a character comprising, a pulse generator having a plurality of outputs, one for each character traverse, and producing at said outputs a plurality of successive square wave voltages, equal in amplitude, duration and frequency, a voltage summing junction at which said voltage coordinates appear, and a plurality of transmission channels between respective generator outputs and said junction, each channel comprising a pulse converter and an attenuator network, each said converter comprising means responsive to a square wave pulse to produce a triangular voltage with equally sloped leading and trailing edges, the plurality of converters producing a succession of triangular pulses overlapping in time and whose graphic sum is a predetermined constant voltage, and each said attenuator network comprising an impedance reducing the amplitude of a triangular voltage transmitted therethrough to the summing junction, thereby to produce successive sums of said triangular pulses at said junction as successive increments of said voltage coordinates.

References Cited

UNITED STATES PATENTS 3,249,879 5/1966 Ward et al. ______ 328—156 XR

JOHN S. HEYMAN, Primary Examiner

J. ZAZWORSKY, Assistant Examiner

U.S. Cl. X.R.

235—197; 307—261, 263; 328—187; 340—146.3